United States Patent [19]

Fling

[11] 4,092,861

[45] June 6, 1978

[54] LIQUID LEVEL MEASURING DEVICE

[76] Inventor: William F. Fling, 351 S. Fuller Ave., Apt. 35, Los Angeles, Calif. 90036

[21] Appl. No.: 768,642

[22] Filed: Feb. 14, 1977

[51] Int. Cl.² .............................................. G01F 23/06
[52] U.S. Cl. ...................................... 73/311; 73/315; 73/321
[58] Field of Search .......................... 73/315, 321, 311; 188/64

[56] References Cited

U.S. PATENT DOCUMENTS

| 210,281 | 11/1878 | Weston | 188/64 |
|---|---|---|---|
| 2,704,891 | 3/1955 | Ferrier et al. | 73/321 X |
| 3,477,132 | 11/1969 | Laurien | 73/315 X |
| 3,622,689 | 11/1971 | Sparks | 188/64 X |
| 3,638,492 | 2/1972 | Fling et al. | 73/315 |

OTHER PUBLICATIONS

"OPW Tank Gauges" - Description & Instructions; Dover Corp.; 1974 & 1975.

Primary Examiner—Donald O. Woodiel
Attorney, Agent, or Firm—William E. Jackson

[57] ABSTRACT

A liquid level measuring device having an elongated frame is disclosed. One or more floats are mounted in the frame on cables mounted between pulleys at each end of the frame. Brake pins frictionally engage the guide cables and means are provided to selectively disengage the brake pins from the guide cables. A thermometer may be attached to the frame to provide temperature readings. Also, a timing device may be attached to the frame to provide the proper duration for obtaining exact temperature and liquid level(s) measurements.

11 Claims, 5 Drawing Figures

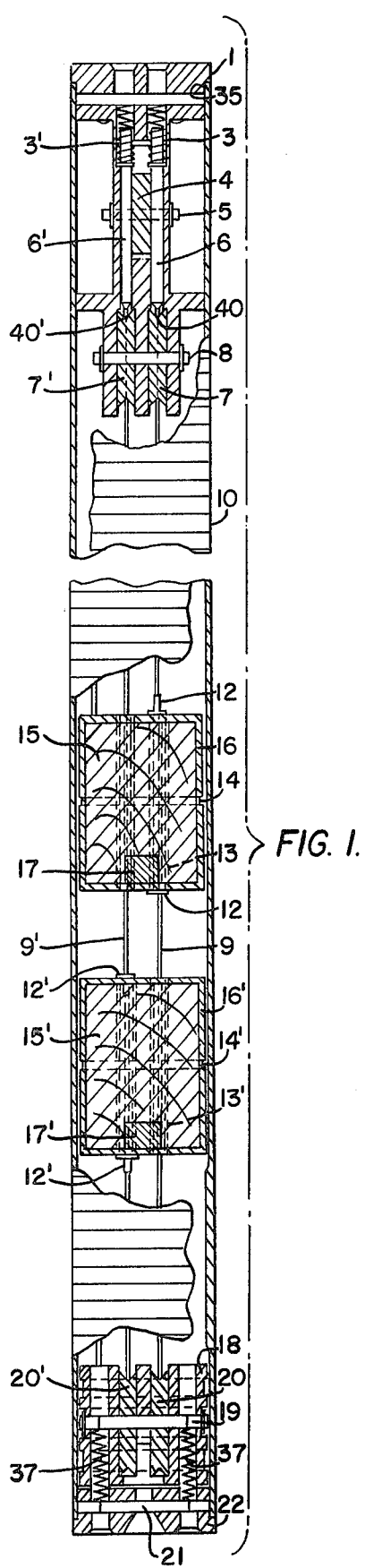
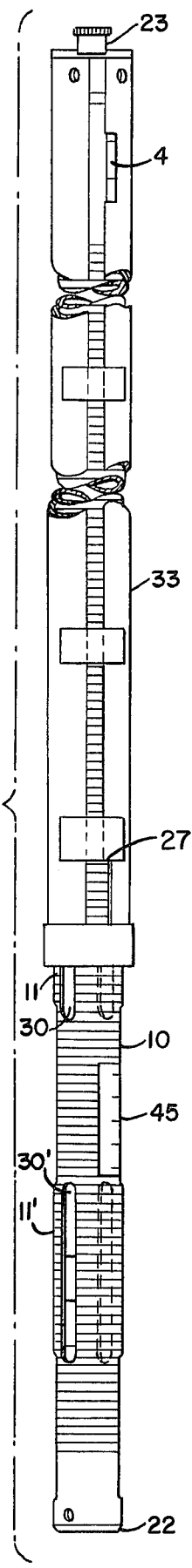
FIG. 1.
FIG. 2.

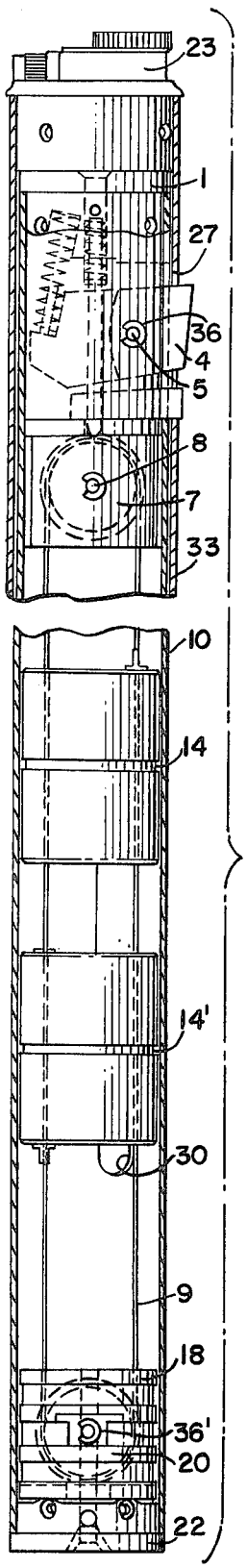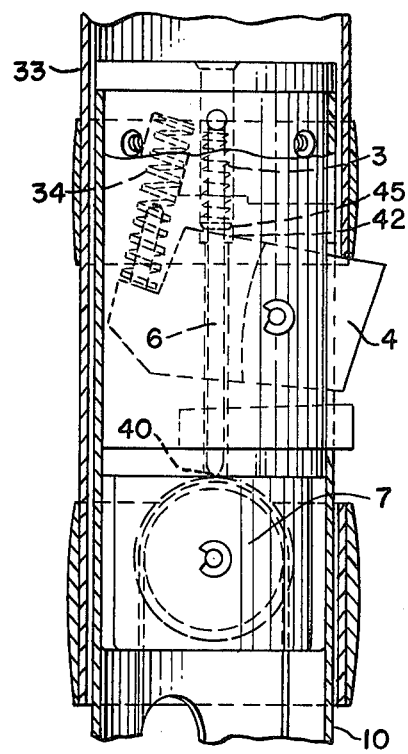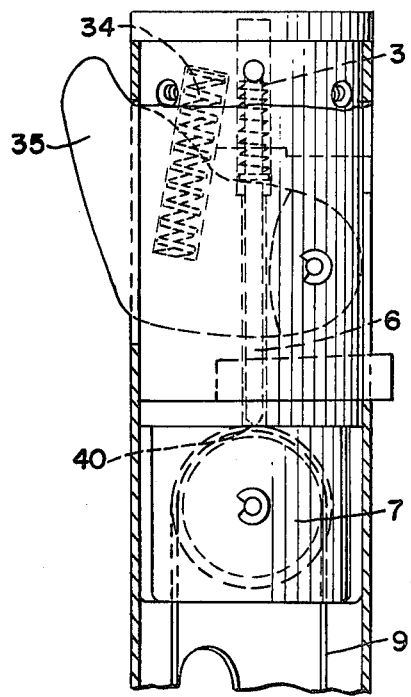

LIQUID LEVEL MEASURING DEVICE

The present invention relates to liquid level measuring and, more particularly, to a liquid level measuring device wherein float(s) are used to provide an indication of liquid level(s).

Obtaining of rapid and accurate measurements of liquids within vessels and containers has been an industrial problem for a long time. Various types of known measuring devices all have drawbacks of one sort or another. Measuring devices using the wetted line principle can produce an accurate measurement, but cannot be reused until the measured liquid has been dried from the measuring surface. Fluids such as petroleum products, i.e., gasoline, oil, kerosene, benzine, turpentine, and other liquids lack color or are subject to rapid evaporation, making accurate and timely measurement difficult.

Many known devices lack the capability to measure several liquids of differing specific gravity in the same container and/or vessel and their respective temperatures. One known procedure relies on the use of paste or powder substances to obtain water and/or gasoline measurements when such fluids are in combined storage. In other known procedures, chemical cartridges are used to determine the water levels. In these instances, exact readings are difficult to obtain and no single device is used. Also, when fluid temperature readings are desired, they are often obtained by a separate instrument. Various kinds of float-type devices are known in the art, but a problem with these devices is that they often result in somewhat inaccurate readings of the level of the liquid and/or liquids.

The present applicant has overcome the above described problems by providing an easily constructed float-type measuring device which produces an exact reading of liquid (or liquids) levels and temperatures.

It is one object of the present invention to provide a new and improved liquid level and temperature measuring device.

Another object is to provide a liquid level measuring device which gives a very accurate reading of the level of one or more liquids contained in the same vessel and/or container.

A further object of the invention is to provide a structure of the character described which is economical to produce and long lasting in usage.

Still other objects and advantages of the present invention will be apparent to those skilled in the art by description of the preferred embodiments which follows.

According to one aspect of the present invention, I provide a liquid level measuring device for a container. The device has an elongated frame insertable into a liquid (or liquids) in the container. A buoyant float(s) is operatively associated with the frame so that the float(s) is movable along the frame by the buoyant forces of the liquid(s) being measured. The float(s) is mounted on the frame by an endless guide cable(s) which is mounted for movement on the frame. The device of the present invention is provided with manually operable means to selectively hold the float(s) in a fixed position after it has floated to the position where it indicates liquid(s) level. The holding means is mounted adjacent one end of the frame and engages the endless guide cable(s) to hold it and the attached float in a fixed position. According to further aspects of the present invention, the measuring device is provided with a temperature sensing means to measure liquid(s) temperature(s). Also, a timing device may be attached to the measuring device to assure that sufficient time is allowed by the operator for the float(s) to seek the liquid(s) level(s) and to obtain the temperature reading of the liquid(s).

FIG. 1 is a partial cut away view showing one embodiment of the liquid level measuring device of the present invention in the normal engaged position.

FIG. 2 is a view showing another embodiment of the present invention.

FIG. 3 is a cross sectional view of FIG. 2 rotated in a manner to show a view of the braking mechanism in the normal locked position.

FIG. 4 is an enlarged view of the embodiment of FIG. 2 showing the braking mechanism in the normal open position.

FIG. 5 is an enlarged view of the embodiment of FIG. 1 showing the use of an optional hand operated brake lever.

Looking at FIGS. 1, 2 and 3, there is shown a frame 10 having guide cables 9 and 9' thereon which extend between upper module 1 and lower module 18. Upper module 1 is attached to frame 10 and 35. Cables 9 and 9' are secured in a normally locked position by means of brake pins 6 and 6', springs 3 and 3' and associated pulleys 7 and 7'. As shown in FIG. 3, brake activator lever 4 extends beyond the exterior of frame 10 and is secured to upper module 1 by pin 5 and lock springs 36. Lower module 18 is slidable within frame 10 to provide a constant tension on guide cables 9 and 9', which tension is provided by connecting module 18 to frame 10 by springs 37, pin 21 and an end plug 22. Guide cables 9 and 9' are attached to module 18 by pulleys 20 and 20', pin 19 and lock springs 36'.

Buoyant floats 16 and 16' surround guide cables 9 and 9' and are attached thereto by stakeons 12 and 12'. Apertures 13 and 13' extend through balsa wood floatation bodies 15 and 15' allowing the floats to move with the guide cables 9 and 9' when the contact edges 40 and 40' on the brake pins 6 and 6' are not in the engaged position with guide cables 9 and 9'. As shown in FIG. 2, scale indicia 11 and 11' on frame 10 are calibrated in metric or decimal increments. Frame 10 is constructed in such a manner that slots 30 and 30' are staggered so as to provide an unobstructed view of wet line 14 and 14' associated with floats 16 and 16' to give exact visual readings of liquid levels when the device 10 is removed from the liquid(s).

In actual operation, the liquid level measuring device of this invention is lowered into a vessel containing liquid(s) until lower end 22 of the frame 10 rests upon the bottom of the vessel. When the embodiment having a telescoping member 33 is used, as shown in FIG. 4, the member 33 is rotated anticlockwise and fully extended out from frame 10. Then, it is rotated in a clockwise manner until slot member 27 rests on brake activating lever 4. As shown in FIGS. 2 and 3, when a timer device 23 is used, it is activated and downward pressure is exerted on telescopic member 33 to activate brake lever 4. The floats 16 and 16' will rise to the level of the respective liquids within the container but remain partially submerged due to their buoyancy. Each has a buoyancy calculated to measure the individual and/or several liquids in accordance with the specific gravity involved. When the telescopic member 33 is not employed, as shown in FIG. 5, an activating handle 35 may be used. Handle 35 may be designed to be interchangeable with brake lever 4 and to operate in a similar manner.

The floats 16 and 16' are calculated to the specific gravity of the fluids being measured. When two or more float members are used, the upper float, calculated with the required lead ballast 17 for the specific gravity of the lighter fluid, will remain partially submerged at the exact wet line 14. The lower float 16', being ballasted with lead to the specific gravity of the heavier fluid, will move through the lighter fluid and remain partially submerged at wet line 14' of float member 16' and will protrude partially into the lighter fluid. This action is obtained by varying the ballast 17 or 17' in floatation member 15 or 15' of the float 16 or 16'. The ballast/floatation ratio includes the required ballast to assure that any friction encountered by the movement of pulleys 7, 7' and 20, 20' around pins 8 and 19 is eliminated.

The release mechanism or disengaging means of the present invention maintains the separation between the guide cables 9, 9' and the brake pins 6, 6' and causes guide cables 9, 9' and pulleys 7, 7' and 20, 20' and floats 16, 16' to move freely. The disengaging means is activated by depressing activating brake lever 4 of FIG. 4 or by lifting brake handle 35 of FIG. 5 permitting the brake lever to rotate on pivot pin 5 causing spring 34 to compress. The pivoting of the brake lever 4 permits its upper surface 42 to contact surfaces 45, 45' on brake pins 6, 6' so as to compress springs 3, 3' and to thereby move the surfaces 40, 40' on brake pins 6, 6' from guide cables 9, 9'. This causes the pulleys 7, 7' and 20, 20' to rotate with guide cables 9, 9', thus moving the floats 16, 16' toward the bottom of the measuring device.

A similar action can be obtained from the manipulation of brake handle 35. When the activating brake lever 4 or activating handle 35 is released, it causes guide cables 9, 9' to be locked in place with floats 16 and 16' and pulleys 7, 7' and 20, 20' due to the force of the brake pins 6, 6' against guide cables 9, 9', as seen in FIG. 1, for example. This is caused by the return to the normal position of activating brake lever 4 or brake handle 35 by the extension of springs 34 and 3, 3' which rotate the brake lever 4 or brake handle 35 downward and permit the braking pins 6, 6' to contact the guide cables 9, 9'. As best shown in FIG. 2, a thermometer member 45 may be mounted on the frame 10 just above the lower liquid level slot 30'.

The present invention has been described in detail with particular reference to the preferred embodiments thereof, but it will be understood that variations and modifications can be effected within the spirit and scope of the invention as described herein and as defined in the appended claims.

I claim:

1. A liquid level measuring device for simultaneously measuring the liquid levels of two liquids in a container, said device comprising:
    (a) an elongated frame insertable into the liquids in said container;
    (b) two floats of different buoyancies;
    (c) means for mounting said floats so that each float is movable along said frame by the buoyant forces of the respective liquids; said mounting means comprising two endless guide cables, means for mounting each guide cable on said frame for independent movement relative to said frame, and means for mounting each float on a respective endless guide cable;
    (d) manually operable means for selectively holding said floats in a fixed position relative to said frame; said holding means being mounted adjacent one end of said frame for engaging each endless guide cable to hold the same in a fixed position relative to said frame.

2. The invention of claim 1 wherein the means for mounting said floats includes a first pair of pulleys rotatably mounted adjacent one end of said frame and a second pair of pulleys rotatably mounted adjacent the other end of said frame, and each of the endless guide cables passes around and in contact with one pulley from each pair.

3. The invention of claim 2 wherein said frame defines a housing with a central axis, said floats are positioned coaxially within said housing, said endless guide cables are constructed and arranged so that they extend parallel to said axis, and each guide cable is connected to a single float and a remaining portion of each guide cable passes through clearance openings in both coaxial floats.

4. The invention of claim 2 wherein said holding means includes two brake pins movably mounted on said frame, said pins having a contact portion biased by spring means toward and into contact with said endless guide cables as they pass around said first pair of the pulleys, and lever means mounted on said frame and having a portion that is adapted to engage said brake pins to move them so that said contact portion moves out of contact with said guide cables, whereby the floats are freed to move with said guide cables.

5. The invention of claim 4 wherein said lever means is adapted to be manually grasped for manipulation from one position to another.

6. The invention of claim 4 wherein an elongated member is mounted on said frame and a portion of said member is engageable with said lever means so that said lever means is movable by said elongated member.

7. The invention of claim 6 wherein said elongated member has a timer means mounted on it so that the user of the measuring device can hold the device in liquid for a predetermined time to insure that the floats reach a stabilized position before they are held in a fixed position on said frame.

8. The invention of claim 7 wherein said frame has a temperature sensing means mounted on it so that the temperature of a liquid in the container may be determined.

9. In a liquid level measuring device for a container, said device having an elongated frame insertable into a liquid in said container, a buoyant float, means for mounting said float on said frame so that said float is movable along said frame by the buoyant forces of the liquid, and manually operable means for selectively holding said float in a fixed position relative to said frame, the improvement wherein:
    (a) said mounting means comprises an endless guide cable, means for mounting said cable on said frame for movement relative to said frame, and means for mounting said float on said endless guide cable; and
    (b) said holding means comprises means mounted adjacent one end of said frame for selectively engaging said endless guide cable to hold the same in a fixed position relative to said frame.

10. The invention of claim 9 wherein: the means for mounting said float includes one pulley rotatably mounted adjacent each end of said frame, and said endless guide cable passes around and in contact with each pulley; said means for holding said float is a brake pin movably mounted on said frame, said pin having a contact portion biased toward and into contact with said endless guide cable as it pases around one of said pulleys, lever means mounted on said frame and having a portion that is adapted to engage said brake pin to move it so that said contact portion moves out of contact with said guide cable whereby the float is freed to move with said guide cable.

11. A liquid level measuring device for simultaneously measuring the liquid levels of two liquids in a container, said device being adapted for manual insertion and removal from said container so that a measurement reading can be made, said device comprising:
 (a) an elongated hollow frame insertable into the liquids in said container;
 (b) two floats of different buoyancies disposed coaxially within said hollow frame;
 (c) scale and indicator means mounted on said frame and floats to provide a visual liquid level reading when said device is removed from said container;
 (d) means for mounting said floats so that each float is axially movable along said frame by the buoyant forces of the respective liquids, said mounting means comprising a first pair of pulleys rotatably mounted inside of said hollow frame adjacent one end thereof and a second pair of pulleys rotatably mounted inside of said hollow frame adjacent the other end thereof; and endless guide cable passing around and in contact with one pulley from each pair; and means for mounting a single float on each guide cable, each guide cable being constructed and arranged so that it extends parallel to the axis of said hollow frame, and each guide cable is connected to a single float while a remaining portion of each guide cable passes through clearance openings in both coaxial floats;
 (e) manually operable means for selectively holding said floats in a fixed position relative to said frame, said holding means being mounted adjacent one end of said frame for engaging each endless guide cable to hold the same in a fixed position relative to said frame, said holding means including two brake pins movably mounted on said frame, said pins having a contact portion biased by spring means toward and into contact with the endless guide cables as they pass around the adjacent pulleys, and lever means mounted on said frame and having a portion that is adapted to engage said brake pins to move them so that said contact portion moves out of contact with said guide cables, whereby the floats are freed to move with said guide cables.

* * * * *